US012724256B2

(12) United States Patent
Wang et al.

(10) Patent No.: US 12,724,256 B2
(45) Date of Patent: Sep. 1, 2026

(54) EXTENSION STRUCTURE, OPTICAL SYSTEM AND SURGICAL MICROSCOPE

(71) Applicant: ZUMAX MEDICAL CO., LTD, Suzhou (CN)

(72) Inventors: Jilong Wang, Suzhou (CN); Jiuqi Xu, Suzhou (CN); Xiaoguang Yang, Suzhou (CN); Jin He, Suzhou (CN)

(73) Assignee: ZUMAX MEDICAL CO., LTD, Suzhou (CN)

( * ) Notice: Subject to any disclaimer, the term of this patent is extended or adjusted under 35 U.S.C. 154(b) by 376 days.

(21) Appl. No.: 18/278,312

(22) PCT Filed: Oct. 14, 2021

(86) PCT No.: PCT/CN2021/123744

§ 371 (c)(1),
(2) Date: Aug. 22, 2023

(87) PCT Pub. No.: WO2022/179116

PCT Pub. Date: Sep. 1, 2022

(65) Prior Publication Data

US 2024/0126064 A1 Apr. 18, 2024

(30) Foreign Application Priority Data

Feb. 23, 2021 (CN) ......................... 202110200223.2

(51) Int. Cl.
*G02B 21/02* (2006.01)
*G02B 21/00* (2006.01)
*G02B 21/24* (2006.01)

(52) U.S. Cl.
CPC ......... *G02B 21/24* (2013.01); *G02B 21/0012* (2013.01); *G02B 21/02* (2013.01)

(58) Field of Classification Search
CPC ..... G02B 21/0012; G02B 21/02; G02B 21/24
See application file for complete search history.

(56) References Cited

U.S. PATENT DOCUMENTS 5,532,872 A 7/1996 Sakamoto et al.
6,661,571 B1 * 12/2003 Shioda .................. A61B 50/13 359/368

(Continued)

FOREIGN PATENT DOCUMENTS

CN 111897119 11/2020
EP 0791339 8/1997
WO 2020141497 7/2020

OTHER PUBLICATIONS

International Search Report and Written Opinion for PCT/CN2021/123744 dated Dec. 17, 2021.

*Primary Examiner* — Paisley L Wilson
(74) *Attorney, Agent, or Firm* — Barnes & Thornburg LLP

(57) ABSTRACT

The present invention relates to an extension structure and an optical system. The extension structure comprises a first connecting base and a second connecting base. One end of the first connecting base forms a first connecting end, and one end of the second connecting base forms a second connecting end. The first connecting base and the second connecting base can be connected in a relatively rotatable manner, and the rotation axis lines of the first connecting base and the second connecting base are parallel. The optical system is arranged in the extension structure. A surgical microscope, comprising a lens body, the extension structure connected to the lens body, a rotating structure connected to the extension structure, and an eyepiece connected to the rotating structure. The extension structure and the rotating structure enables the eyepiece to move up and down relative to the lens body, the adjustment region is large.

20 Claims, 7 Drawing Sheets

(56) References Cited

U.S. PATENT DOCUMENTS

| | | | |
|---|---|---|---|
| 2004/0095639 | A1 | 5/2004 | Mora |
| 2009/0244704 | A1 | 10/2009 | Kolster et al. |
| 2012/0087006 | A1 | 4/2012 | Signaigo |

* cited by examiner

EXTENSION STRUCTURE, OPTICAL SYSTEM AND SURGICAL MICROSCOPE

CROSS-REFERENCE TO RELATED APPLICATION

This application is U.S. national phase under 35 U.S.C. § 371 of International Patent Application No. PCT/CN2021/123744, filed on Oct. 14, 2021, which claims priority to Chinese Application No. 2021102002232, filed on Feb. 23, 2021, the contents of all of which are incorporated by reference in their entirety.

TECHNICAL FIELD OF THE INVENTION

The present disclosure belongs to the field of medical apparatus and instruments, and relates to a surgical microscope, particularly to an extension structure and an optical system thereof, and a surgical microscope with this extension structure.

BACKGROUND OF THE INVENTION

At present, surgical microscopes are widely used in the oral field, with their perfect field of vision, excellent lighting, and comfortable operating posture, making more and more dentists recognize their enormous prospects in oral treatment. The main lens portion of a surgical microscope generally comprises a binocular tube, eyepieces, a zoom objective lens (VarioDist), a handle, a microscope body, etc., and a full high-definition image system, an LED integrated lighting module and an optical zoom are built in the microscope body. The lens of a surgical microscope can move and flip accurately in the horizontal and vertical directions according to the needs of examination and treatment. In most cases, the lens of a surgical microscope should be positioned at the horizontal position, where the doctor can observe through the binocular tube. The mechanical system is the skeleton of a surgical microscope, which determines the range of activity of the microscope. The current binocular tube with a variable angle of 0°-190° conforms to the principle of ergonomics, and clinicians can adjust the binocular tube according to their comfortable sitting posture, which can effectively reduce the physical fatigue of dentists. The design of a surgical microscope needs to be combined with the clinician's experience and feedback in order to better promote it. Some dentists reported that the adjustable range of the binocular tube is limited, and the height at which the binocular tube descends or rises in the horizontal position cannot meet the adjustment requirement of dentists; some dentists also reported that the distance between the microscope body and the binocular tube was slightly short, making it difficult to adjust the height downwards in the horizontal position. Clinicians need to work for a long time. These factors will more or less cause muscle strain in the waist, neck and shoulder, which is not conducive to the physical and mental health of dentists.

Refer to the patents with publication numbers of CN108020914A, CN211123465U, and CN106610523A, they disclose surgical microscopes, each comprises a rotating structure arranged between the microscope body and the eyepieces, so that the eyepieces can rotate relatively in an up-down direction relative to the microscope body, however, there is a problem that the height at which the eyepieces descend or rise cannot meet the adjustment; or is a problem that the distance between the microscope body and the eyepieces is a little short, so it is difficult to adjust the height downwards in the horizontal position.

SUMMARY OF THE INVENTION

One purpose of the present disclosure is to provide an extension structure suitable for surgical microscopes, which can be mounted as an accessory between the microscope body and the eyepiece according to usage needs, and is simple and convenient.

To achieve the above purpose, a technical solution employed by the present disclosure is:

An extension structure, with an optical path channel formed inside, comprises a first connecting base and a second connecting base, one end of the first connecting base forms a first connecting end, one end of the second connecting base forms a second connecting end, the first connecting base and the second connecting base are connected in a relatively rotatable manner, and the rotation axis lines of the first connecting base and the second connecting base are parallel.

Preferably, the extension structure further comprises a mounting base, with one end of the mounting base forming a first mounting end and the other end forming a second mounting end, the second mounting end of the mounting base is connected to the first connecting end of the first connecting base, and the swing amplitude of the eyepiece relative to the microscope body in an upward or downward direction can be increased through the mounting base. An angle $\alpha$ is formed between the plane where the first mounting end of the mounting base is located and the plane where the second mounting end of the mounting base is located, and the range of the angle $\alpha$ is $0° < \alpha \leq 90°$, preferably $30° \leq \alpha \leq 90°$ C., and when the angle is 90°, the eyepiece has the maximum swing amplitude relative to the microscope body.

Preferably, the extension structure further comprises a third connecting base, and the first connecting base and the second connecting base are connected via the third connecting base. The third connecting base is arranged on at least one side of the first connecting base and the second connecting base. The third connecting base can not only connect the first connecting base and the second connecting base, but also cover a rotating transmission assembly.

More further preferably, the extension structure further comprises a rotating transmission assembly, the rotating transmission assembly comprises a first transmission gear and a second transmission gear, the first transmission gear is connected to the first connecting base, the second transmission gear is connected to the second connecting base, and the first transmission gear and the second transmission gear mesh.

One purpose of the present disclosure is to provide an optical system of an extension structure, so that it will not affect the clarity, filling, and other aspects of the field of view of a surgical microscope due to the addition of a length of optical system.

To achieve the above purpose, a technical solution employed by the present disclosure is:

An optical system of an extension structure, where the extension structure has an optical path channel formed inside, and comprises a mounting base, a first connecting base, a second connecting base, and a third connecting base, one end of the mounting base forms a first mounting end and the other end forms a second mounting end, one end of the first connecting base forms a first connecting end, one end of the second connecting base forms a second connecting end, the second mounting end of the mounting base is connected to the first connecting end of the first connecting base, the first connecting base and the second connecting base are connected via the third connecting base, and the first connecting base and the second connecting base are connected in a relatively rotatable manner.

The mounting base, the first connecting base, the third connecting base, and the second connecting baseform the optical path channel internally, and the optical system is arranged within the optical path channel, and the optical system comprises a first lens group, a second lens group, and a third lens group, the first lens group satisfies: 30 mm<fG1<150 mm; the second lens group satisfies: 2<fG2/fG1<10; the third lens group satisfies: 0.5<fG3/fG1<5, wherein, fG1 is the focal length of the first lens group, fG2 is the focal length of the second lens group, and fG3 is the focal length of the third lens group.

Preferably, the first lens group satisfies: 50 mm<fG1<150 mm; the third lens group satisfies: 0.5<fG3/fG1<2.

Preferably, the first lens group is a doublet lens group with positive focal power, this doublet lens group satisfies:

$$\frac{|R_1|}{\phi_{1/2}} < 15,$$

wherein, $R_1$ is the curvature radius of the cemented surface of the first lens group, and $\varphi_1$ is the effective pore size of the cemented surface; the second lens group is a triplet lens group with positive focal power; a doublet lens group of the third lens group satisfies:

$$\frac{|R_3|}{\phi_{3/2}} < 15,$$

wherein, $R_3$ is the curvature radius of the cemented surface of the third lens group, and $\varphi_3$ is the effective pore size of the cemented surface; the first lens group, the second lens group, and the third lens group meet the requirements of ensuring smooth observing light and the clarity of the observed image when relative rotation occurs between the first connecting base and the second connecting base.

Further preferably, the first lens group comprises a first lens and a second lens arranged sequentially along the direction of the optical path; the second lens group comprises a third lens, a fourth lens, and a fifth lens arranged sequentially along the optical path direction; the third lens group comprises a sixth lens and a seventh lens arranged sequentially along the optical path direction, providing a specific manner for arranging the lenses.

Preferable, the optical system further comprises a steering lens group used to change the direction of light projection, the steering lens group comprises a first steering lens, a second steering lens, a third steering lens, and a fourth steering lens, and the optical path sequentially passes through the first lens group, the first steering lens, the second steering lens, the third steering lens, the second lens group, the fourth steering lens, and the third lens group. Due to the fact that the light does not pass in a straight line between the first connecting base and the second connecting base, it can be turned by arranging the steering lenses.

Further preferably, the first steering lens is a pentaprism, and the second steering lens, the third steering lens, and the fourth steering lens are right-angled prisms.

Further preferably, the first lens group and the first steering lens are arranged in the mounting base; the second steering lens is arranged in the first connecting base; the third steering lens is arranged in the third connecting base; the second lens group is arranged in the third connecting base or the second connecting base; the fourth steering lens and the third lens group are arranged in the second connecting base.

One purpose of the present disclosure is to provide a surgical microscope, specifically a surgical microscope provided with an extension structure, which expands a wider area in the original adjustment area to meet more needs of users.

To achieve the above purpose, a technical solution employed by the present disclosure is:

A surgical microscope, comprises a microscope body and an eyepiece connected to the microscope body, the eyepiece is connected to the microscope body via a rotating structure, so that the eyepiece can rotate in an up-down direction relative to the microscope body, the surgical microscope further comprises an extension structure, the extension structure comprises a first connecting base and a second connecting base, one end of the first connecting base forms a first connecting end, one end of the second connecting base forms a second connecting end, the first connecting end of the first connecting base is connected to the microscope body, the second connecting end of the second connecting base is connected to the rotating structure, the first connecting base and the second connecting base are connected in a relatively rotatable manner, and the rotation axis lines of the first connecting base and the second connecting base extend in the left-right direction of the microscope body, so that the rotating structure can rotate in the up-down direction relative to the microscope body.

Preferably, the extension structure further comprises a mounting base, with one end of the mounting base forming a first mounting end and the other end forming a second mounting end, the first mounting end of the mounting base is connected to the microscope body, the second mounting end of the mounting base is connected to the first connecting end of the first connecting base, and the swing amplitude of the eyepiece relative to the microscope body in an upward or downward direction can be increased through the mounting base. And after mounting the mounting base, the adjustment amplitude of the eyepiece relative to the microscope body in the up-down direction is −100~110 mm.

Preferably, when the eyepiece is rotated relative to the microscope body in the up-down direction, the eyepiece always remains horizontal.

Preferably, the second connecting end of the second connecting base is rotatably connected to the rotating structure, so that the rotating structure can rotate about its own axis. A specific implementation is as follows: the surgical microscope further comprises a rotating ring structure, the rotating ring structure comprises a connecting ring and a rotating ring, the connecting ring and the rotating ring are arranged in a manner that they can be rotated about their own axis lines, the connecting ring is fixedly connected to the second connecting end of the second connecting base, and the rotating ring is fixedly connected to the rotating structure. The connecting ring is provided with a groove body, and the rotating ring is arranged inside the groove body. The outer peripheral surface of the rotating ring is provided with a plurality of grooves, and one end of a positioning component is inserted into the groove passing through the connecting ring, causing the connecting ring and the rotating ring which are capable of rotating relative to each other being locked.

Further preferably, the rotation angle of the rotating structure relative to the extension structure rotating around its own axis is ±25°.

Due to the use of the above technical solutions, the present disclosure has the following advantages over the prior art:

1. The adjustable area is wider, which can ensure that clinicians obtain ergonomic clinical sitting posture, effectively reduce and prevent muscle strain in the waist, neck, and shoulders, and keep clinicians away from the troubles of cervical and lumbar spondylosis;
2. Providing more diverse adjustments to meet the needs of dentists' own sitting postures;
3. Simple structure and convenient installation.

DETAILED DESCRIPTION OF EXEMPLARY EMBODIMENTS

Figure 1:
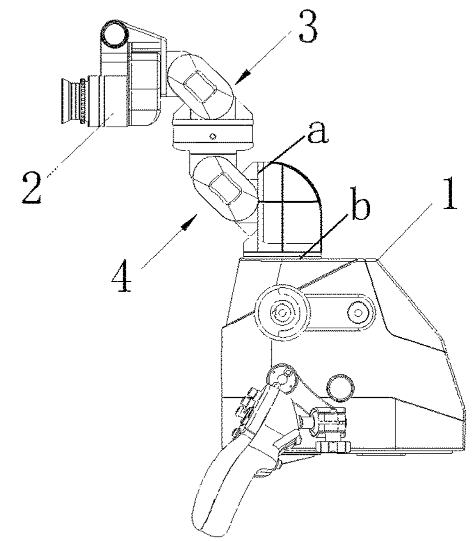
FIG. 1 is a schematic main view of a first implementation of the surgical microscope in this embodiment (with the eyepiece rotated to the top-most position)

The technical solutions of the present disclosure will be described clearly and completely below with reference to the accompanying drawings. Apparently, the described embodiments are merely some of rather than all of the embodiments of the present disclosure. All other embodiments obtained by those of ordinary skill in the art without creative efforts based on the embodiments of the present disclosure shall fall within the protective scope of the present disclosure.

In the description of the present disclosure, it should be noted that the orientations or positional relationships indicated by the terms "center", "upper", "lower", "left", "right", "vertical", "horizontal", "inner", "outer", etc. are based on those shown in the accompanying drawings, are only for the convenience of describing the present disclosure and simplifying the description, rather than indicating or implying that the indicated device(s) or element(s) must have a specific orientation, be constructed and operated in a specific orientation, and therefore should not be construed as a limitation of the present disclosure. Furthermore, the terms "first", "second", "third" are used for descriptive purposes only and should not be construed to indicate or imply relative importance.

In the description of the present disclosure, it should be noted that, unless otherwise expressly specified and limited, the terms "mount", "communicate", and "connect" should be understood in a broad sense, for example, it may be fixedly connected or detachably connected, or integrated; it may be mechanically connected or electrically connected; it can be directly connected or indirectly connected through an intermediate medium, or it can be the internal communication of two elements. For those of ordinary skill in the art, the specific meanings of the above terms in the present disclosure can be understood according to specific situations.

A surgical microscope, as shown in FIGS. 1-8, comprises a microscope body 1 and an eyepiece 2 connected to the microscope body 1, the eyepiece 2 shown in the figure is a binocular tube, and the eyepiece 2 is connected to the microscope body 1 via a connecting structure, wherein the connecting structure comprises a rotating structure 3, and the eyepiece 2 is connected to the microscope body 1 via the rotating structure 3, so that the eyepiece 2 can rotate in the up-down direction relative to the microscope body 1, or the eyepiece 2 can swing in the up-down direction relative to the microscope body 1.

In this embodiment, the connecting structure further comprises an extension structure 4 arranged between the microscope body 1 and the eyepiece 2, the eyepiece 2 is connected to the rotating structure 3, the rotating structure 3 is connected to the extension structure 4, and then the extension structure 4 is connected to the microscope body 1. Through the extension structure 4, the height adjustment for the eyepiece 2 to descend or rise can be achieved; the distance between the microscope body 1 and the eyepiece 2 has been increased, and the angle of adjustment in the horizontal position is greater.

Figure 9:
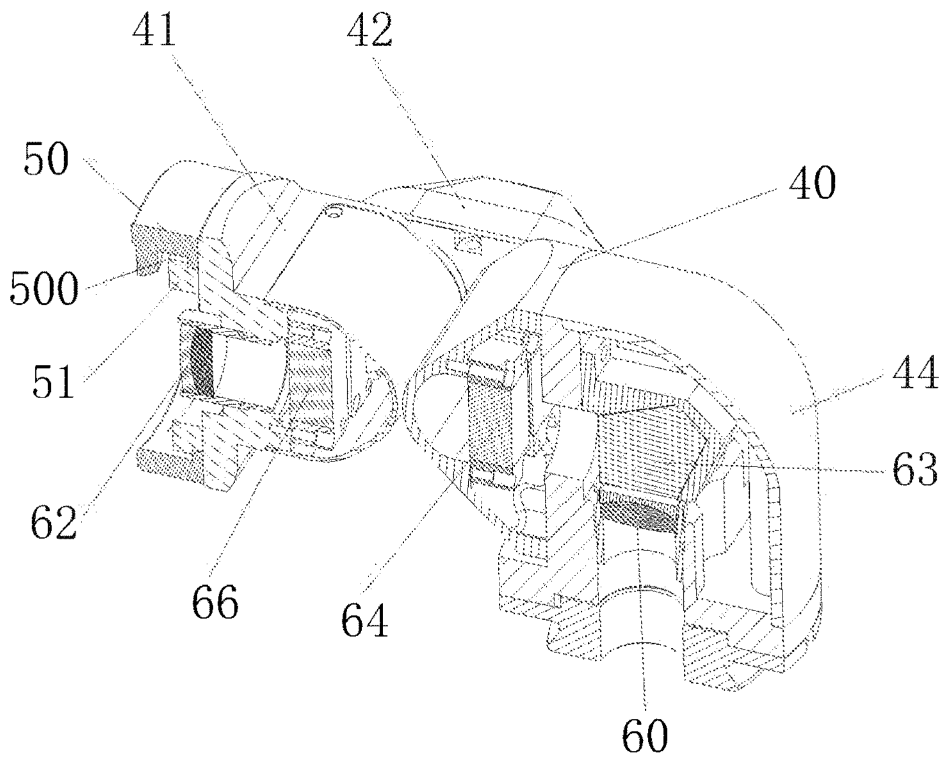
FIG. 9 is cross-sectional schematic diagram I of the extension structure in this embodiment.
Figure 10:
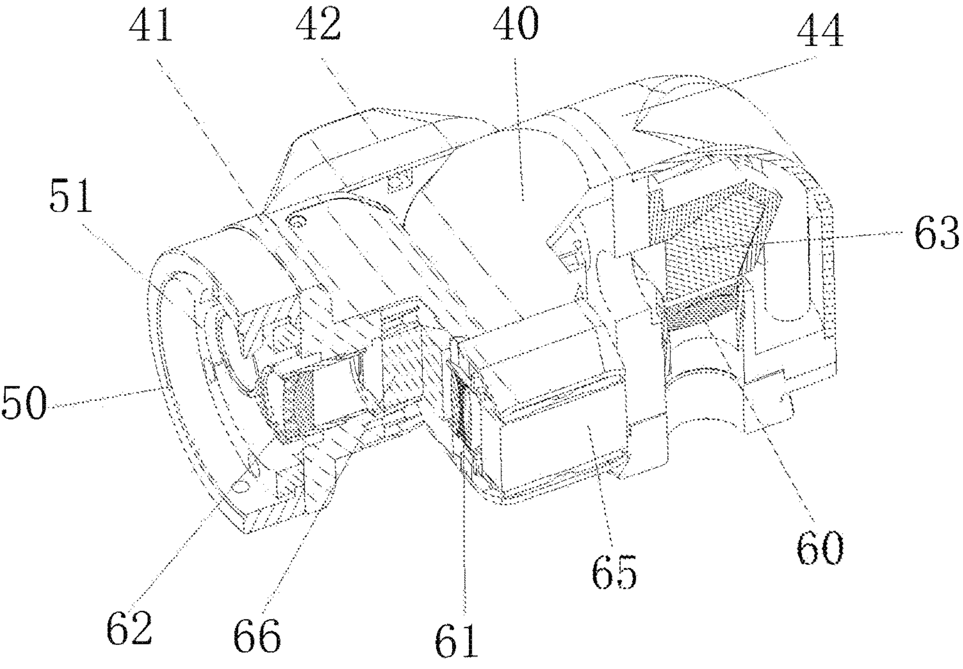
FIG. 10 is cross-sectional schematic diagram II of the extension structure in this embodiment.

Specifically, as shown in FIGS. 9 and 10, the extension structure 4 comprises a first connecting base 40 and a second connecting base 41, one end of the first connecting base 40 forms a first connecting end 400, one end of the second connecting base 41 forms a second connecting end 410, the first connecting end 400 of the first connecting base 40 is connected to the microscope body 1, the second connecting end 410 of the second connecting base 41 is connected to the rotating structure 3, the first connecting base 40 and the second connecting base 41 is connected in a relative rotatable manner, and the rotation axis lines of the first connecting base 40 and the second connecting base 41 extend in the left-right direction of the microscope body 1, so that the rotating structure 3 can rotate in the up-down direction relative to the microscope body 1, or the rotating structure 3 can swing in the up-down direction relative to the microscope body 1, thereby achieving the rotation or swing of the eyepiece 2 in the up-down direction relative to the microscope body 1.

For the structure rotatably connected between the first connecting base 40 and the second connecting base 41, a specific implementation is provided below, but it is not limited to this: the extension structure 4 further comprises a third connecting base 42 and a rotating transmission assembly, wherein:

The third connecting base 42 is arranged on at least one side of the first connecting base 40 and the second connecting base 41, and can be connected to the first connecting base 40 and the second connecting base 41 in a form such as a buckle. In this embodiment, due to the binocular tube, there are third connecting bases 42 on both sides used to set up the optical system, the third connecting bases 42 are arranged on both sides of the first connecting base 40 and the second connecting base 41, and the first connecting base 40 and the second connecting base 41 are connected via the third connecting bases 42, that is, there is no direct connection between the first connecting base 40 and the second connecting base 41.

Figure 11:
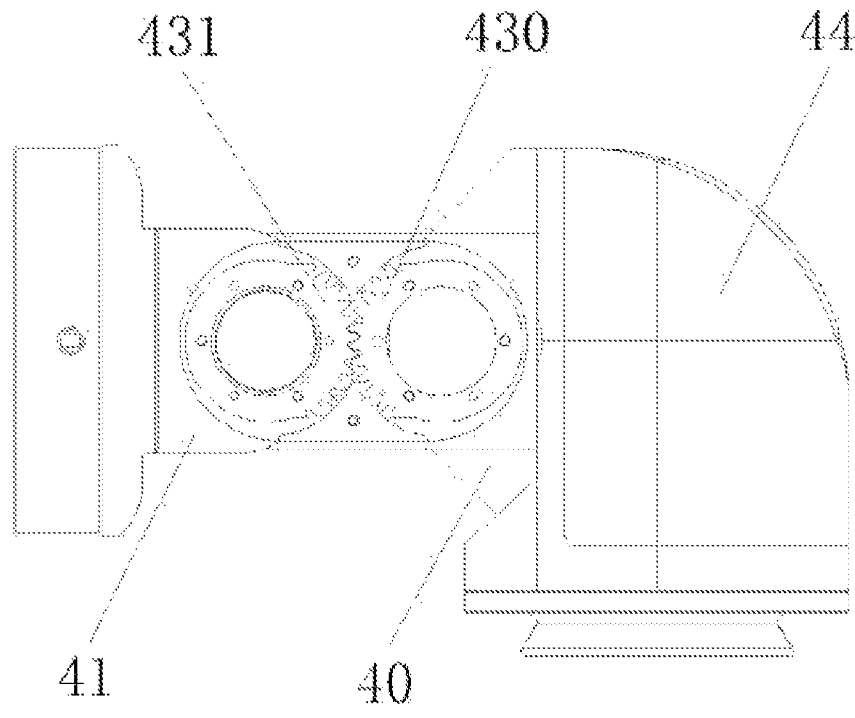
FIG. 11 is a schematic diagram of the rotating transmission assembly in this embodiment.
Figure 12:
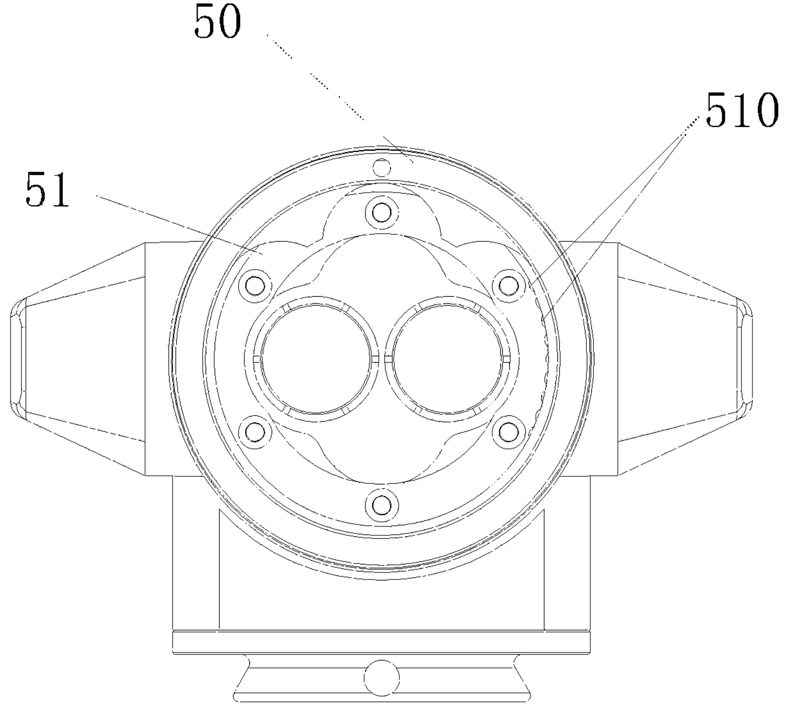
FIG. 12 is a schematic diagram of the rotating ring structure in this embodiment.

The rotating transmission assembly is arranged inside the third connecting bases 42, or the third connecting bases 42 cover the rotating transmission assembly, so that it will not be exposed to the outside, and as shown in FIG. 11: it comprises a first transmission gear 430 and a second transmission gear 431, the first transmission gear 430 is connected to the first connecting base 40, the second transmission gear 431 is connected to the second connecting base 42, and the first transmission gear 430 and the second transmission gear 431 mesh. In this way, when the eyepiece 2 is rotated up or down, the first transmission gear 430 drives the second transmission gear 431 to rotate, achieving the adjustment of the angle of the eyepiece 2, however, when the rotation of the eyepiece 2 is stopped, the meshing of the first transmission gear 430 and the second transmission gear 431 achieves self-locking of the two and does not rotate.

Of course, torque and damping adjustments can also be used according to the load of the eyepiece 2 to maintain the balance of the microscope, the damping adjustment of the extension structure is relatively tight (without affecting the comfort of operation), and lubrication washers and corrugated washers can be added internally to increase the friction force during rotation, allowing the microscope to maintain balance. After loading the eyepiece 2, the entire front section area can be balanced by the fine adjustment of the tightness of the screws, allowing the eyepiece 2 to hang at any angle.

The extension structure 4 further comprises a mounting base 44, with one end forming a first mounting end 440 and the other end forming a second mounting end 441, the first mounting end 440 of the mounting base 44 is connected to the microscope body 1, and the second mounting end 441 of the mounting base 44 is connected to the first connecting end 400 of the first connecting base 40. An angle $\alpha$ is formed between the plane a where the first mounting end 440 of the mounting base 44 is located and the plane b where the second mounting end 441 of the mounting base 44 is located, and the range of the angle $\alpha$ is $0° < \alpha \leq 90°$, preferably $30° \leq \alpha \leq 90°$.

Figure 2:
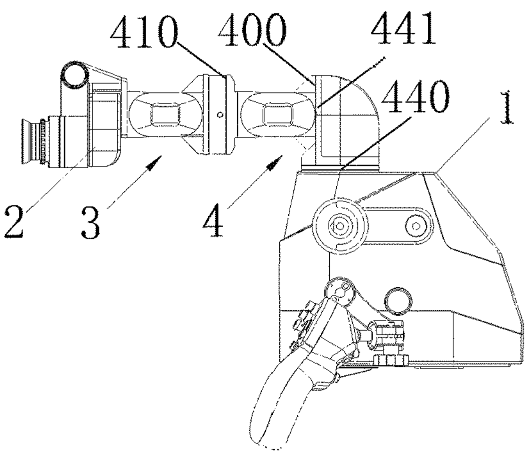
FIG. 2 is a schematic main view of the first implementation of the surgical microscope in this embodiment (with the eyepiece rotated to the horizontal position)
Figure 3:
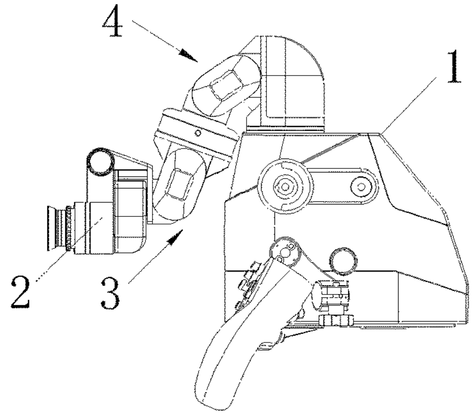
FIG. 3 is a schematic main view of the first implementation of the surgical microscope in this embodiment (with the eyepiece rotated to the lowest position)

The mounting base 44 is not necessary:

The surgical microscope shown in FIGS. 1-3 is provided with a mounting base 44, and the angle $\varphi$ formed between the plane a where the first mounting end 440 of the mounting base 44 is located and the plane b where the second mounting end 441 of the mounting base 44 is located is 90°, in this structure, based on the rotation of the eyepiece 2 as shown in FIG. 2 to the horizontal position, the adjustment amplitude of the eyepiece 2 relative to microscope body 1 in the up-down direction is −100~100 mm, that is, the maximum adjustment amplitude for upward adjustment is 100 mm, and the maximum adjustment amplitude for downward adjustment is 100 mm, at this point, the eyepiece 2 can swing the maximum amplitude relative to the microscope body 1 in the up-down direction.

Figure 4:
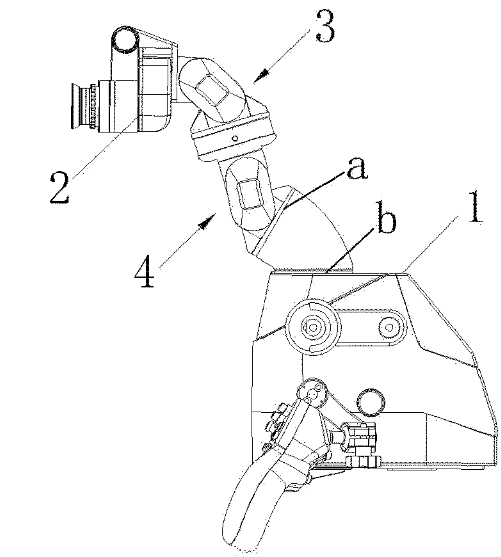
FIG. 4 is a schematic main view of a second implementation of the surgical microscope in this embodiment (with the eyepiece rotated to the top-most position)
Figure 5:
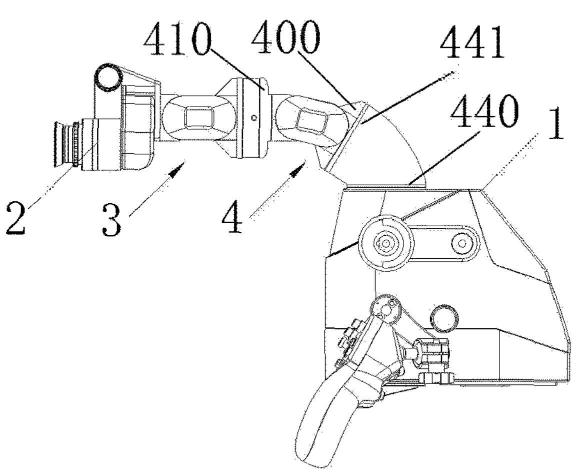
FIG. 5 is a schematic main view of the second implementation of the surgical microscope in this embodiment (with the eyepiece rotated to the horizontal position)
Figure 6:
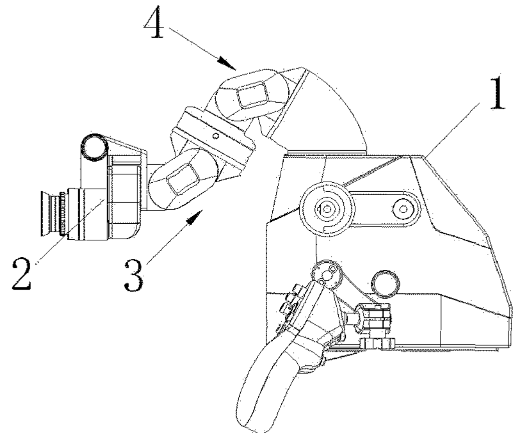
FIG. 6 is a schematic main view of a second implementation of the surgical microscope in this embodiment (with the eyepiece rotated to the lowest position)

The surgical microscope shown in FIGS. 4-6 is also provided with a mounting base 44, and the angle $\alpha$ formed between the plane a where the first mounting end 440 of the mounting base 44 is located and the plane b where the second mounting end 441 of the mounting base 44 is located is 60°, in this structure, based on the rotation of the eyepiece 2 as shown in FIG. 5 to the horizontal position, the adjustment amplitude of the eyepiece 2 relative to microscope body 1 in the up-down direction is −50~110 mm, that is, the maximum adjustment amplitude for upward adjustment is 110 mm, and the maximum adjustment amplitude for downward adjustment is 50 mm.

Figure 7:
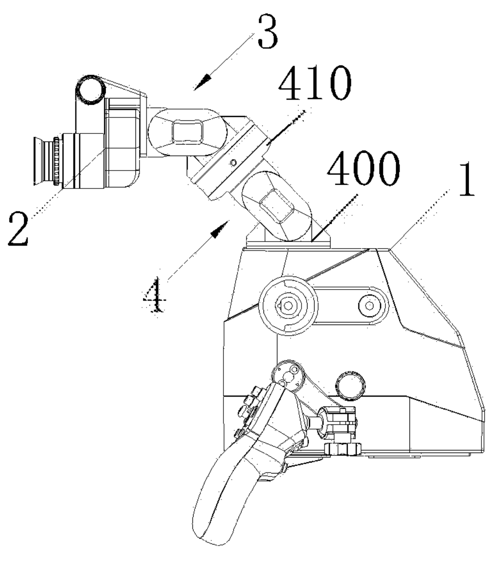
FIG. 7 is a schematic main view of a third implementation of the surgical microscope in this embodiment (with the eyepiece rotated to the top-most position)
Figure 8:
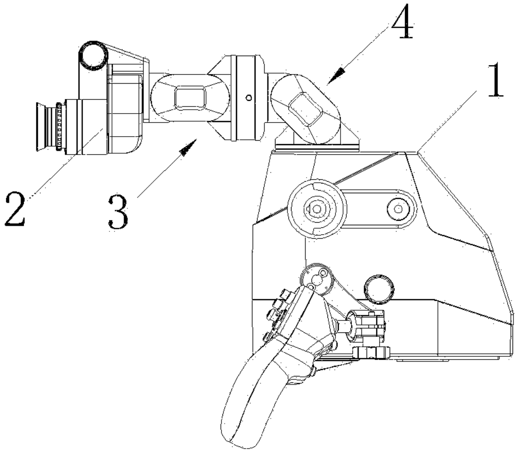
FIG. 8 is a schematic main view of the third implementation of the surgical microscope in this embodiment (with the eyepiece rotated to the horizontal position)

For the surgical microscope shown in FIGS. 7-8, the first connecting end 400 of the first connecting base 40 is directly connected to the microscope body 1, in this structure, based on the rotation of the eyepiece 2 as shown in FIG. 8 to the horizontal position, the adjustment amplitude of the eyepiece 2 relative to microscope body 1 in the up-down direction is 0~55 mm, that is, the maximum adjustment amplitude for upward adjustment is 55 mm, and it cannot be adjusted downward temporarily.

In this way, while maintaining the horizontal position of the binocular tube, the height can be freely adjusted up and down, with an amplitude of about 200 mm. In comparison, the adjustment amplitude of the eyepiece without the extension structure 4 in the up-down direction relative to the microscope body is 0. Using the extension structure 4 of the above three structures, when the eyepiece 2 rotates (swings) and adjusts in the up-down direction relative to the microscope body 1, the eyepiece 2 always remains horizontal. The entire extension structure has a total length of 152 mm, with a total length of 117 mm from the center position, which will not affect the operation of the user (dentist) due to overlong length.

Figure 13:
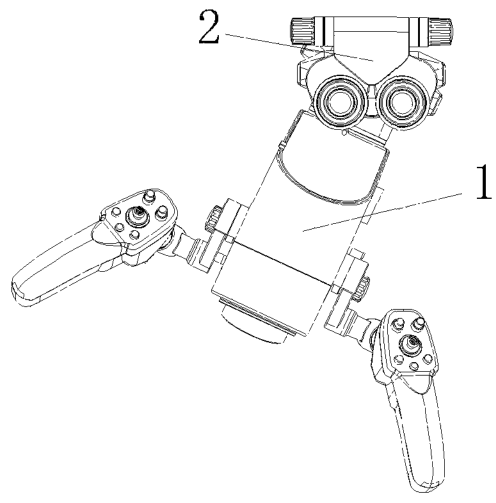
FIGS. 13 and 14 are schematic diagrams of the rotation of the microscope body relative to the eyepiece in this embodiment.
Figure 14:
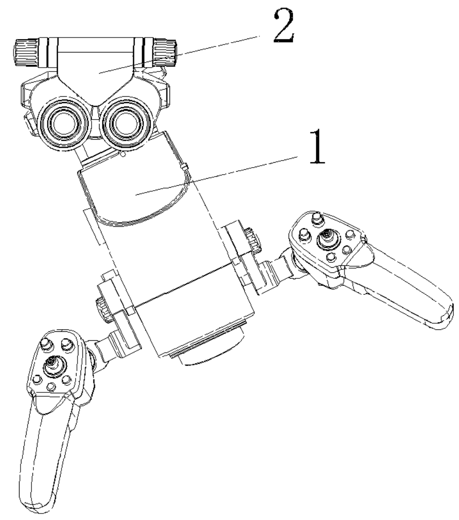

In this embodiment, the second connecting end 410 of the second connecting base 41 is rotatably connected to the rotating structure 3, so that the rotating structure 3 can rotate around its own axis. Due to that the rotating structure 3 is connected to the eyepiece 2, and the extension structure 4 is connected to the microscope body 1, the rotation of the rotating structure 3, allows the microscope body 1 and eyepiece 2 to rotate, or swing, relative to each other in the left-right direction, as shown in FIGS. 13 and 14, if the eyepiece 2 is kept horizontal, the microscope body 1 is rotated relative to the eyepiece 2 at a rotation (swing) angle of ±25°, which can be designed as an ergonomic function specifically for dental general practitioners. This ±25-degree pendulum system function allows the microscope body 1 to swing left or right while a doctor's sitting position remains unchanged, namely the eyepiece 2 maintains a horizontal observation position.

For the structure of the rotating structure 3 rotating around its own axis relative to the extension structure 4, a specific implementation is provided below, but it is not limited to this:

The surgical microscope further comprises a rotating ring structure, the rotating ring structure comprises a connecting ring 50 and a rotating ring 51, the connecting ring 50 and the rotating ring 51 are arranged in a manner that they can be rotated relative to their own axis lines, specifically, the connecting ring 50 is provided with a groove body 500, and the rotating ring 51 is arranged inside the groove body 500. The connecting ring 50 is fixedly connected to the second connecting end 410 of the second connecting base 41, and the rotating ring 51 is fixedly connected to the rotating structure 3, thereby achieving the rotation of the microscope body 1 relative to the eyepiece 2.

In addition, the outer peripheral surface of the rotating ring 51 is provided with a plurality of grooves 510, and one end of a positioning component such as a screw is inserted into a groove 510 passing through the connecting ring 50, so that the connecting ring 50 and the rotating ring 51, which are capable of rotating relative to each other, are locked. The positioning component can be threaded to the connecting ring 50, and the positioning component can be loosened to make it break away from the groove 510, which can make the rotating structure and the extension structure 4 rotate relatively, and after the rotation is in place, the positioning component is tightened, so that it can be inserted into the grooves 510 again, the number of grooves 510 can be provided according to the required adjustment angle.

For the rotating structure of this application, a structure with the same extension structure can be used, of course, other structures can also be used, which is no longer repeated here.

Figure 15:
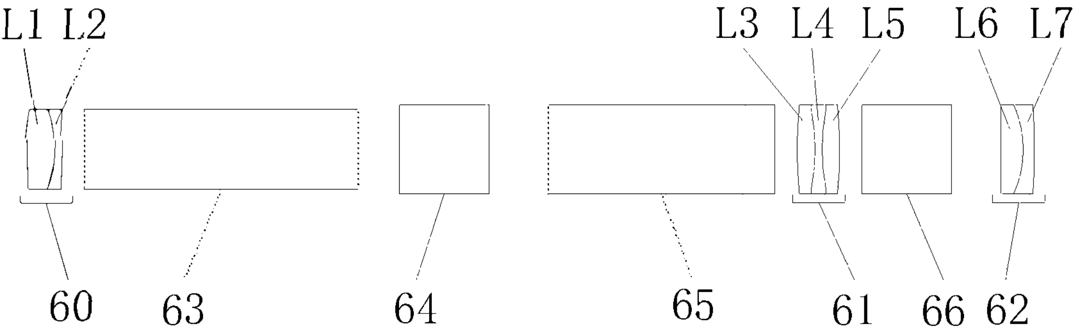
FIG. 15 is a schematic diagram of the optical system in this embodiment.

As shown in FIG. 15, the optical system is arranged in the extension structure 4, in which the mounting base, the first connecting base, the third connecting base and the second connecting base form the optical path channel internally, and the optical system is arranged the optical path channel, which can form the imaging optical path, specifically:

The optical system comprises a first lens group 60, a second lens group 61, a third lens group 62 and a steering lens group. Wherein, the first lens group 60 is a doublet lens group with positive focal power, and specifically comprises a first lens L1, and a second lens L2 arranged sequentially along the direction of the optical path, and the first lens group 60 satisfies: 30 mm<fG1<150 mm, preferably 50 mm<fG1<150 mm, wherein, fG1 is the focal length of the first lens group, meanwhile the doublet lens group of the first lens group 60 satisfies:

$$\frac{|R_1|}{\phi_{1/2}} < 15,$$

wherein, $R_1$ is the curvature radius of the cemented surface of the first lens group, and $\varphi_1$ is the effective pore size of the cemented surface.

The second lens group 61 is a triplet lens group with positive focal power, and specifically comprises a third lens L3, a fourth lens L4, and a fifth lens L5 arranged sequentially along the direction of the optical path, and the second lens group 61 satisfies: 2<fG2/fG1<10, wherein, fG2 is the focal length of the second lens group.

The third lens group 62 is a doublet lens group with positive focal power, and specifically comprises a sixth lens L6, and a seventh lens L7 arranged sequentially along the direction of the optical path, and the third lens group 62 satisfies: 0.5<fG3/fG1<5, preferably 0.5<fG3/fG1<2, wherein, fG3 is the focal length of the third lens group, meanwhile the doublet lens group of the third lens group 62 satisfies:

$$\frac{|R_3|}{\phi_{3/2}} < 15,$$

wherein, $R_3$ is the curvature radius of the cemented surface of the third lens group, and $\varphi_3$ is the effective pore size of the cemented surface.

The steering lens group is used to change the direction of light projection, and the steering lens group comprises a first steering lens 63, a second steering lens 64, a third steering lens 65, and a fourth steering lens 66, in this embodiment, the first steering lens 63 is a pentaprism, and the second steering lens 64, the third steering lens 65, and the fourth steering lens 66 are right-angled prisms.

Figure 16:
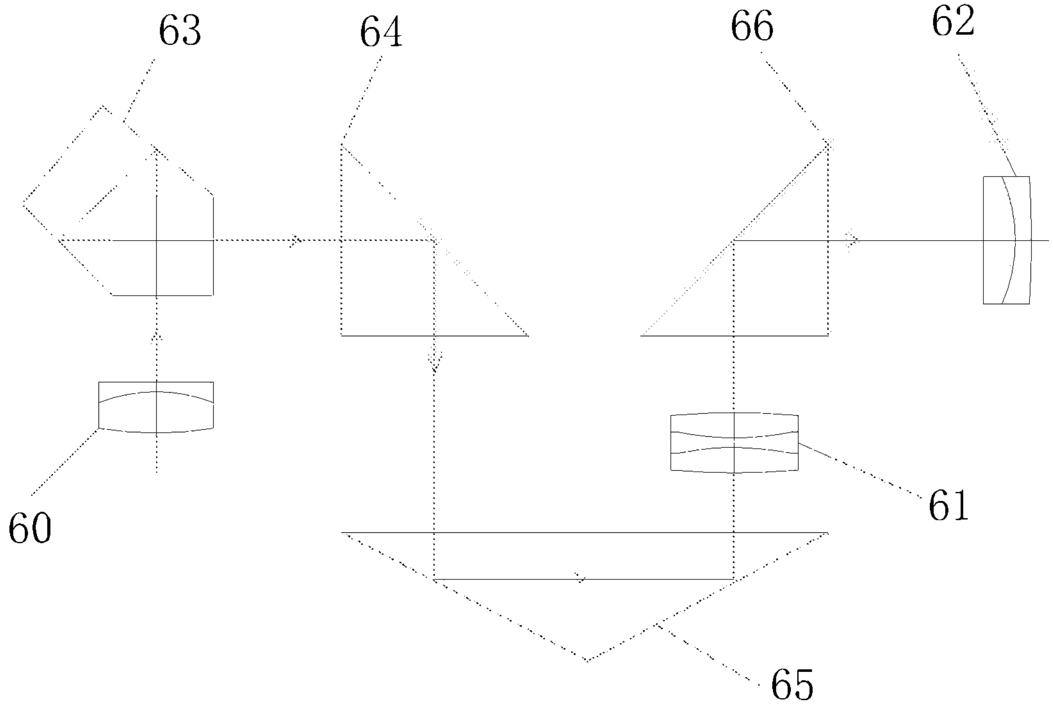
FIG. 16 is a schematic diagram of the optical path of the optical system in this embodiment.

In this embodiment, as shown in FIG. 16, the first lens group 60, the first steering lens 63, the second steering lens 64, the third steering lens 65, the second lens group 61, the fourth steering lens 66, and the third lens group 62 are sequentially arranged in the optical path, parallel light beam is incident from the first lens group 60, enters the third steering lens 65 through the first steering lens 63 and the second steering lens 64, and focuses into a real image at the third steering lens 65, then forms parallel light through the second lens group 61, the fourth steering lens 66 and the third lens group 62, which exits and is finally observed by the eyepiece 2. In theory, it is also possible not to provide the second lens group 61 between the third steering lens 65 and the fourth steering lens 66, however, due to the length of the light path, and to obtain better imaging results, in this embodiment, the second lens group 61 is provided between the third steering lens 65 and the fourth steering lens 66. Similarly, in theory, a lens group can further be arranged between the second steering lens 64 and the third steering lens 65, but the first steering lens 63 uses a pentaprism, which has extended the optical path, in order to make the structure more compact, the lens group here can be omitted.

In this embodiment, the first lens group 60 and the first steering lens 63 are arranged in the mounting base 44; the second steering lens 64 is arranged in the first connecting base 40; the third steering lens 65 (can also be arranged in the second connecting base 41) and the second lens group 61 are arranged in the third connecting base 42 on one side; the fourth steering lens 66 and the third lens group 62 are arranged in the second connecting base 41.

For the binocular tube in this embodiment, the first lens group 60, the second lens group 61, the third lens group 62 and the steering lens group are provided in two sets.

EMBODIMENTS

| Surface Number | Radius | Thickness | $N_d$ | $V_d$ |
|---|---|---|---|---|
| 1 | 34.66 | 6.5 | 1.4338 | 94.996 |
| 2 | −81.458 | 1.5 | 1.8467 | 23.78 |
| 3 | −253.07 | 5 | | |
| 4 | Infinity | 61.4 | 1.5168 | 64.167 |
| 5 | Infinity | 17 | | |
| 6 | Infinity | 20 | 1.5168 | 64.167 |
| 7 | Infinity | 19.5 | | |
| 8 | Infinity | 51 | 1.5168 | 64.167 |
| 9 | Infinity | 5 | | |
| 10 | −72.535 | 4 | 1.4338 | 94.996 |
| 11 | −702.5 | 1.5 | 1.8467 | 23.78 |
| 12 | 34.54 | 5 | 1.4338 | 94.996 |
| 13 | −22.805 | 5 | | |
| 14 | Infinity | 20 | 1.5168 | 64.167 |
| 15 | Infinity | 19.825 | | |

-continued

| Surface Number | Radius | Thickness | $N_d$ | $V_d$ |
|---|---|---|---|---|
| 16 | 45.299 | 5 | 1.8467 | 23.78 |
| 17 | 84.294 | 2.5 | 1.4338 | 94.996 |
| 18 | 90.901 | | | |

Wherein, the radius is the radius of curvature of the lens surface, the thickness is the thickness of the lens center, and $N_d$ is the refractive index of d line (wavelength 589.3 nm) in optical glass; $V_d$ is the dispersion coefficient of d line (wavelength 589.3 nm).

Through the above arrangement, when using the eyepiece 2 to swing and adjust in the up-down direction relative to the microscope body 1, or when the eyepiece 2 is rotated left and right relative to the microscope body 1, the observation of the optical path will not be affected at all.

The embodiments described above are only for illustrating the technical concepts and features of the present disclosure, and are intended to make those skilled in the art being able to understand the present disclosure and thereby implement it, and should not be concluded to limit the protective scope of this disclosure. Any equivalent variations or modifications according to the spirit of the present disclosure should be covered by the protective scope of the present disclosure.

What is claimed is:

1. An extension structure, with an optical path channel formed inside, wherein, the extension structure comprises a first connecting base and a second connecting base, one end of the first connecting base forms a first connecting end, one end of the second connecting base forms a second connecting end, the first connecting base and the second connecting base are connected in a relatively rotatable manner, and a rotation axis lines of the first connecting base and the second connecting base are parallel;

wherein an optical system is arranged within the optical path channel, and the optical system comprises a first lens group, a second lens group, and a third lens group, the first lens group satisfies: 30 mm$<f_{G1}<$150 mm; the second lens group satisfies: $2<f_{G2}/f_{G1}<10$; the third lens group satisfies: $0.5<f_{G3}/f_{G1}<5$, wherein, $f_{G1}$ is a focal length of the first lens group, $f_{G2}$ is a focal length of the second lens group, and $f_{G3}$ is a focal length of the third lens group.

2. The extension structure according to claim 1, wherein the extension structure further comprises a mounting base, with one end of the mounting base forming a first mounting end and an other end forming a second mounting end, the second mounting end of the mounting base is connected to the first connecting end of the first connecting base;

the extension structure further comprises a third connecting base, the first connecting base and the second connecting base are connected via the third connecting base, and the first connecting base and the second connecting base are rotatably connected to the third connecting base, respectively.

3. The extension structure according to claim 2, wherein an angle $\alpha$ is formed between a plane where the first mounting end of the mounting base is located and a plane where the second mounting end of the mounting base is located, and a range of the angle $\alpha$ is $0°<\alpha\leq 90°$; and/or the optical system further comprises a steering lens group used to change a direction of light projection, the steering lens group comprises a first steering lens, a second steering lens, a third steering lens, and a fourth steering lens; the first lens group and the first steering lens are arranged in the mounting base; the second steering lens is arranged in the first connecting base; the third steering lens is arranged in the third connecting base; the second lens group is arranged in the third connecting base or the second connecting base; the fourth steering lens and the third lens group are arranged in the second connecting base.

4. The extension structure according to claim 2, wherein an angle $\alpha$ is formed between a plane where the first mounting end of the mounting base is located and a plane where the second mounting end of the mounting base is located, and a range of the angle $\alpha$ is $30°\leq\alpha\leq 90°$.

5. The extension structure according to claim 2, wherein the extension structure further comprises a rotating transmission assembly which is arranged within the third connecting base.

6. The extension structure according to claim 1, wherein the extension structure further comprises a third connecting base which is arranged on at least one side of the first connecting base and the second connecting base; and/or the extension structure further comprises a rotating transmission assembly, the rotating transmission assembly comprises a first transmission gear and a second transmission gear, the first transmission gear is connected to the first connecting base, the second transmission gear is connected to the second connecting base, and the first transmission gear and the second transmission gear mesh; and/or the first lens group satisfies: 50 mm$<f_{G1}<$150 mm; and/or the third lens group satisfies: $0.5<f_{G3}/f_{G1}<2$; and/or the first lens group is a doublet lens group with positive focal power; the second lens group is a triplet lens group with positive focal power; the third lens group is a doublet lens group with positive focal power; and/or the first lens group comprises a first lens and a second lens arranged sequentially along a direction of an optical path; the second lens group comprises a third lens, a fourth lens, and a fifth lens arranged sequentially along an optical path direction; the third lens group comprises a sixth lens and a seventh lens arranged sequentially along an optical path direction; and/or the optical system further comprises a steering lens group used to change a direction of light projection, the steering lens group comprises a first steering lens, a second steering lens, a third steering lens, and a fourth steering lens, and an optical path sequentially passes through the first lens group, the first steering lens, the second steering lens, the third steering lens, the second lens group, the fourth steering lens, and the third lens group.

7. An optical system of an extension structure, the extension structure having an optical path channel formed inside, and comprising a mounting base, a first connecting base, a second connecting base, and a third connecting base, one end of the mounting base forming a first mounting end and an other end forming a second mounting end, one end of the first connecting base forming a first connecting end, one end of the second connecting base forming a second connecting end, the second mounting end of the mounting base being connected to the first connecting end of the first connecting base, the first connecting base and the second connecting base being connected via the third connecting base, the first connecting base and the second connecting base being connected in a relatively rotatable manner, wherein the mounting base, the first connecting base, the second connecting base, and the third connecting base form the optical path channel internally, the optical system is arranged within the optical path channel, and the optical system comprises a first lens group, a second lens group, and a third lens group, the first lens group satisfies: 30 mm<$f_{G1}$<150 mm; the second lens group satisfies: 2<$f_{G2}/f_{G1}$<10; the third lens group satisfies: 0.5<$f_{G3}/f_{G1}$<5, wherein, $f_{G1}$ is a focal length of the first lens group, $f_{G2}$ is a focal length of the second lens group, and $f_{G3}$ is a focal length of the third lens group.

8. The optical system of an extension structure according to claim 7, wherein the first lens group satisfies: 50 mm<$f_{G1}$<150 mm; and/or, the third lens group satisfies: 0.5<$f_{G3}/f_{G1}$<2.

9. The optical system of an extension structure according to claim 7, wherein the first lens group is a doublet lens group with positive focal power; the second lens group is a triplet lens group with positive focal power; the third lens group is a doublet lens group with positive focal power.

10. The optical system of an extension structure according to claim 9, wherein the doublet lens group of the first lens group satisfies:

$$\frac{|R_1|}{\phi_{1/2}} < 15,$$

wherein, $R_1$ is a curvature radius of a cemented surface of the first lens group, and $\varphi_1$ is an effective pore size of the cemented surface; and/or the doublet lens group of the third lens group satisfies:

$$\frac{|R_3|}{\phi_{3/2}} < 15,$$

wherein, $R_3$ is a curvature radius of a cemented surface of the third lens group, and $\varphi_3$ is an effective pore size of the cemented surface.

11. The optical system of an extension structure according to claim 7, wherein the first lens group comprises a first lens and a second lens arranged sequentially along a direction of an optical path; the second lens group comprises a third lens, a fourth lens, and a fifth lens arranged sequentially along an optical path direction; the third lens group comprises a sixth lens and a seventh lens arranged sequentially along an optical path direction.

12. The optical system of an extension structure according to claim 7, wherein the optical system further comprises a steering lens group used to change a direction of light projection, the steering lens group comprises a first steering lens, a second steering lens, a third steering lens, and a fourth steering lens, and an optical path sequentially passes through the first lens group, the first steering lens, the second steering lens, the third steering lens, the second lens group, the fourth steering lens, and the third lens group.

13. The optical system of an extension structure according to claim 12, wherein the first steering lens is a pentaprism, and the second steering lens, the third steering lens, and the fourth steering lens are right-angled prisms; and/or the first lens group and the first steering lens are arranged in the mounting base; the second steering lens is arranged in the first connecting base; the third steering lens is arranged in the third connecting base; the second lens group is arranged in the third connecting base or the second connecting base; the fourth steering lens and the third lens group are arranged in the second connecting base.

14. A surgical microscope, comprising a microscope body and an eyepiece connected to the microscope body, the eyepiece being connected to the microscope body via a rotating structure, so that the eyepiece can rotate in an up-down direction relative to the microscope body, wherein the surgical microscope further comprises an extension structure, the extension structure comprises a first connecting base and a second connecting base, one end of the first connecting base forms a first connecting end, one end of the second connecting base forms a second connecting end, the first connecting end of the first connecting base is connected to the microscope body, the second connecting end of the second connecting base is connected to the rotating structure, the first connecting base and the second connecting base are connected in a relatively rotatable manner, and a rotation axis lines of the first connecting base and the second connecting base extend in a left-right direction of the microscope body, so that the rotating structure can rotate in an up-down direction relative to the microscope body;

wherein an optical system is arranged within the optical path channel, and the optical system comprises a first lens group, a second lens group, and a third lens group, the first lens group satisfies: 30 mm<$f_{G1}$<150 mm; the second lens group satisfies: 2<$f_{G2}/f_{G1}$<10; the third lens group satisfies: 0.5<$f_{G3}/f_{G1}$<5, wherein, $f_{G1}$ is a focal length of the first lens group, $f_{G2}$ is a focal length of the second lens group, and $f_{G3}$ is a focal length of the third lens group.

15. The surgical microscope according to claim 14, wherein the extension structure further comprises a mounting base, with one end of the mounting base forming a first mounting end and an other end forming a second mounting end, the first mounting end of the mounting base is connected to the microscope body, and the second mounting end of the mounting base is connected to the first connecting end of the first connecting base; and/or an adjustment amplitude of the eyepiece relative to the microscope body in the up-down direction is −100~110 mm; and/or when the eyepiece is rotated relative to the microscope body in the up-down direction, the eyepiece always remains horizontal; and/or the first lens group satisfies: 50 mm<$f_{G1}$<150 mm; and/or the third lens group satisfies: 0.5<$f_{G3}/f_{G1}$<2; and/or the first lens group is a doublet lens group with positive focal power; the second lens group is a triplet lens group with positive focal power; the third lens group is a doublet lens group with positive focal power; and/or the first lens group comprises a first lens and a second lens arranged sequentially along a direction of an optical path; the second lens group comprises a third lens, a fourth lens, and a fifth lens arranged sequentially along an optical path direction; the third lens group comprises a sixth lens and a seventh lens arranged sequentially along an optical path direction; and/or the optical system further comprises a steering lens group used to change a direction of light projection, the steering lens group comprises a first steering lens, a second steering lens, a third steering lens, and a fourth steering lens, and an optical path sequentially passes through the first lens group, the first steering lens, the second steering lens, the third steering lens, the second lens group, the fourth steering lens, and the third lens group; and/or the extension structure further comprises a mounting base and a third connecting base; the optical system further comprises a steering lens group used to change a direction of light projection, the steering lens group comprises a first steering lens, a second steering lens, a third steering lens, and a fourth steering lens; the first lens group and the first steering lens are arranged in the mounting base; the second steering lens is arranged in the first connecting base; the third steering lens is arranged in the third connecting base; the second lens group is arranged in the third connecting base or the second connecting base; the fourth steering lens and the third lens group are arranged in the second connecting base; and/or the first lens group is a doublet lens group with positive focal power; the second lens group is a triplet lens group with positive focal power; the third lens group is a doublet lens group with positive focal power; the doublet lens group of the first lens group satisfies:

$$\frac{|R_1|}{\varphi_{1/2}} < 15,$$

wherein, $R_1$ is a curvature radius of a cemented surface of the first lens group, and $\varphi_1$ is an effective pore size of the cemented surface; and/or the doublet lens group of the third lens group satisfies:

$$\frac{|R_3|}{\varphi_{3/2}} < 15,$$

wherein, $R_3$ is a curvature radius of a cemented surface of the third lens group, and $\varphi_3$ is an effective pore size of the cemented surface; and/or the optical system further comprises a steering lens group used to change a direction of light projection, the steering lens group comprises a first steering lens, a second steering lens, a third steering lens, and a fourth steering lens; the first steering lens is a pentaprism, and the second steering lens, the third steering lens, and the fourth steering lens are right-angled prisms.

16. The surgical microscope according to claim 14, wherein the second connecting end of the second connecting base is rotatably connected to the rotating structure, so that the rotating structure can rotate around its own axis.

17. The surgical microscope according to claim 16, wherein the surgical microscope further comprises a rotating ring structure, the rotating ring structure comprises a connecting ring and a rotating ring, the connecting ring and the rotating ring are arranged in a manner that they can be rotated about their own axis lines, the connecting ring is fixedly connected to the second connecting end of the second connecting base, and the rotating ring is fixedly connected to the rotating structure.

18. The surgical microscope according to claim 17, wherein the connecting ring is provided with a groove body, and the rotating ring is arranged inside the groove body.

19. The surgical microscope according to claim 18, wherein an outer peripheral surface of the rotating ring is provided with a plurality of grooves, and one end of a positioning component is inserted into one of the plurality of grooves passing through the connecting ring, causing the connecting ring and the rotating ring which are capable of rotating relative to each other being locked.

20. The surgical microscope according to claim 16, wherein a rotation angle of the rotating structure relative to the extension structure rotating about its own axis is ±25°.

* * * * *